US009980123B2

(12) United States Patent
Mecklin et al.

(10) Patent No.: US 9,980,123 B2
(45) Date of Patent: May 22, 2018

(54) NODE AND METHOD FOR PROVIDING AUTHENTICATION OF A WIRELESS DEVICE IN A ROAMING STATE

(71) Applicant: TELEFONAKTIEBOLAGET L M ERICSSON (PUBL), Stockholm (SE)

(72) Inventors: Tomas Mecklin, Kyrkslätt (FI); Jari Arkko, Kauniainen (FI); Heidi-Maria Back, Helsinki (FI); Miljenko Opsenica, Espoo (FI); Le Wang, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 14/784,487

(22) PCT Filed: Oct. 6, 2015

(86) PCT No.: PCT/EP2015/073030
§ 371 (c)(1),
(2) Date: Oct. 14, 2015

(87) PCT Pub. No.: WO2017/059891
PCT Pub. Date: Apr. 13, 2017

(65) Prior Publication Data
US 2017/0156047 A1 Jun. 1, 2017

(51) Int. Cl.
H04W 4/00 (2018.01)
H04W 8/02 (2009.01)
H04W 8/24 (2009.01)

(52) U.S. Cl.
CPC ............... *H04W 8/02* (2013.01); *H04W 8/24* (2013.01)

(58) Field of Classification Search
CPC ............. H04L 2209/38; H04L 2209/80; H04L 63/061; H04L 63/08; H04L 9/3236; H04W 12/04; H04W 12/06; H04W 36/0038; H04W 88/02
USPC ...................................................... 455/432.1
See application file for complete search history.

(56) References Cited

U.S. PATENT DOCUMENTS

2010/0064135 A1*  3/2010  Thakare ................ H04W 12/06
                                                           713/156
2011/0039518 A1    2/2011  Maria
2012/0076082 A1*  3/2012  Pison .................... H04W 12/06
                                                           370/329

(Continued)

OTHER PUBLICATIONS

International Search Report and the Written Opinion of the International Searching Authority, issued in corresponding International Application No. PCT/EP2015/073030, dated Jun. 15, 2016, 10 pages.

*Primary Examiner* — Timothy Pham
(74) *Attorney, Agent, or Firm* — Rothwell, Figg, Ernst & Manbeck, P.C.

(57) ABSTRACT

Example embodiments presented herein are directed towards a physical node, and corresponding methods therein, for providing authentication of a wireless device within a visiting wireless network while the wireless device is in a roaming state. The wireless device is registered to a home wireless network. The physical node further comprises a virtual representation of a functionality of at least one core network node controlled by the home wireless network. Thus, such authentication may be provided and control according to home network based procedures.

14 Claims, 8 Drawing Sheets

(56) References Cited

U.S. PATENT DOCUMENTS

2013/0279401 A1* 10/2013 Sander ................. H04W 48/18
                                                      370/328
2014/0146673 A1   5/2014 Parker
2016/0262015 A1*  9/2016 Lee .................... H04L 61/6054
2016/0269899 A1*  9/2016 Carames .............. H04W 12/06

* cited by examiner

NODE AND METHOD FOR PROVIDING AUTHENTICATION OF A WIRELESS DEVICE IN A ROAMING STATE

CROSS REFERENCE TO RELATED APPLICATION(S)

This application is a 35 U.S.C. § 371 National Phase Entry Application from PCT/EP2015/073030, filed Oct. 6, 2015, designating the United States, the disclosure of which is incorporated herein in its entirety by reference.

BACKGROUND

In a typical cellular system, also referred to as a wireless communications network, wireless terminals, also known as mobile stations and/or user equipment units communicate via a Radio Access Network (RAN) to one or more core networks. The wireless terminals can be Machine-to-Machine (M2M) devices, Internet-of-Things devices, mobile stations or user equipment units such as mobile telephones also known as "cellular" telephones, and laptops with wireless capability, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

A Public Land Mobile Network (PLMN) is a network established and maintained by an operator. An operator provides mobile services to wireless devices through its PLMN. A PLMN is identified by a Mobile Country Code and a Mobile Network Code. A PLMN which a wireless device is registered to is referred to as a home wireless network. Once a wireless device travels to another PLMN, other than the home wireless network, this is referred to as a roaming state. In a roaming state, a wireless device is served by a visiting PLMN, which is referred to as a visiting wireless network.

In LTE, roaming is done either by local breakout or home routing. In local breakout, the home operator will receive information about the usage from the remote network, by using, for example, 3GPP's Policy and Charging Control Architecture. EPC handles Mobility Management and breakout in core network nodes such as the MME, SGW and/or PGW.

In current deployments, the visited network operator usually own the infrastructure as well as the network services and conforms to a set of 3GPP standards to handle roaming and breakout, either local or home routing. Similar architecture is used both for Voice over LTE and data. Charging and subscriber usage information is exchanged between the visited network and home network via Policy and Charging Rules Function 30 (PCRF) nodes. Such procedures are further described in 3GPP TS.23.203 and GSMA IR.88 LTE Roaming Guidelines, Version 6.0, 31 Aug. 2011.

SUMMARY

Mobile roaming is growing and generating revenue for network operators and data roaming in particular is growing at the expense of voice. However, international mobile data roaming may be expensive compared to domestic mobile data usage. Using mobile networks, for example, for global industrial solutions would impose a significant cost for roaming. An example would be a global sensor network for the supervision of windmill installation at various geographical locations. In some cases, a local sensor data aggregation function would be beneficial to deploy in the network prior to sending bulk data into a home network for further processing. By pre-processing the data, local measures could be taken based on the received data. Currently the aggregation function must be deployed 'outside' the core network, even if having it in conjunction with the core network components would be beneficial.

Drivers for data usage in roaming scenarios are mobile applications and video. In some mobile applications as well as video use case, caching of data significantly reduces the amount of traffic to and from internet as well as improves roundtrip times for accessing data. Smart caching solutions perhaps require information about the core network and/or access network in order to optimize caching mechanisms. The caching mechanisms might be dependent of the use case as well as application being used. Caching of secure data, for example, for Netflix is one such example. In these cases it would be beneficial to use specific network components, created on a need basis, in the visited network infrastructure.

At least one object of the example embodiments presented herein is to reduce signaling required during a roaming procedure. Thus, the example embodiments presented herein are directed towards providing a virtualized functionality in a visiting wireless network which is controlled by a home wireless network.

An example advantage of some of the example embodiments presented herein is the simplification of the roaming solutions with reduced signaling dependencies between the home and the visited networks. The virtualized functionality makes the roaming application portable and easy to clone to the remote network infrastructure. The virtualized functionality may comprise various functions and resources. That way, roaming functionality can be used within the visiting wireless network rather than from the home network. In addition, proprietary features may be used in a remote location, without the overhead of signaling to/from the home network.

A further example advantage is that the traffic between home and remote networks will decrease, as majority of the operations for a particular service or application can be done locally in the remote network. This is also true for local breakout and data aggregation. The decreased inter-domain network traffic may decrease the cost for the end user. This makes applications cost acceptable and highly usable in the roaming networks and boost their global usage.

Accordingly, some of the example embodiments are directed towards a method in a physical node. The physical node is situated in a visiting wireless network. The method is for providing authentication of a wireless device within the visiting wireless network while the wireless device is in a roaming state. The wireless device is registered to a home wireless network and the physical node comprising a virtual representation of a functionality of at least one core network node controlled by the home wireless network.

The method comprises receiving, from a base station of the visiting wireless network, an attach request for the wireless device. The method further comprises authenticating an identity of the wireless device based on an authentication procedure of the home wireless network. If the identity of the wireless device is deemed to be authenticated, the method further comprises sending, to the base station of the visiting network, a verification message. The verification message indicates an authenticity of the wireless device and further indicates roaming services, via the virtual representation of the functionality, are to be applied to the wireless device.

Some of the example embodiments are directed towards a physical node. The physical node is situated in a visiting wireless network. The physical node is configured to provide authentication of a wireless device within the visiting wireless network while the wireless device is in a roaming state. The wireless device is registered to a home wireless network and the physical node comprising a virtual representation of a functionality of at least one core network node controlled by the home wireless network. The physical node comprises a processor and a memory, where the memory comprises instructions executable by the processor whereby the physical node is operative to perform operations.

The physical node is operative to receive, from a base station of the visiting wireless network, an attach request for the wireless device. The physical node is further operative to authenticate an identity of the wireless device based on an authentication procedure of the home wireless network. If the identity of the wireless device is deemed to be authenticated, the physical node is further operative to send, to the base station of the visiting network, a verification message. The verification message indicates an authenticity of the wireless device and further indicates roaming services, via the virtual representation of the functionality, are to be applied to the wireless device.

Definitions

3GPP Third Generation Partnership Project
AS Application Server
BSC Base Station Controller
BSS Business Support System
E-UTRAN Evolved Universal Terrestrial Radio Access Network
eNodeB Evolved NodeB
EPC Evolved Packet Core
GERAN GSM/EDGE Radio Access Network
GGSN Gateway GPRS Support Node
GPRS General Packet Radio Service
GSM Global System for Mobile Communications
GSMA GSM Association
HLR Home Location Register
HSS Home Subscriber Server
IMS Internet Protocol Multimedia Subsystem
IoT Internet of Things
LTE Long Term Evolution
NFVI Network Function Virtualization Infrastructure
M2M Machine-to-Machine
MANO Management and Network Orchestration
MME Mobility Management Entity
MTC Machine Type Communication
OSS Operational Support System
PCRF Policy Control and Charging Rules Function
PDN Packet Data Network
PGW PDN Gateway
PLMN Public Land Mobile Network
RAN Radio Access Network
RAT Radio Access Type
RBS Radio Base Station
RNC Radio Network Controller
SCS Service Capability Server
SGSN Serving GPRS Support Node
SGW Serving Gateway
UE User Equipment
UMTS Universal Mobile Telecommunications System
UTRAN UMTS Terrestrial Radio Access Network
VIM Virtualized Infrastructure Manager
WCDMA Wideband Code Division Multiple Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN or E-UTRAN based system. It should further be appreciated that the term wireless device, wireless terminal, M2M device, MTC device, IoT device and user equipment may be used interchangeably.

General Overview

The example embodiments presented herein are directed towards a physical node, situated in a visiting network, configured to provide authentication for a wireless device within the visiting network while the wireless device is in a roaming state. Thus, the wireless device is registered to a home wireless network. The physical node comprises a virtual representation of a functionality of at least one core network node controlled by the home wireless network. Therefore, such authentication, and communications handling in general, may be performed according to home network based procedures. Thus, the example embodiments presented herein provide a means of serving a wireless device in a roaming state while reducing the amount of communications between the home and visiting network.

Figure 1:
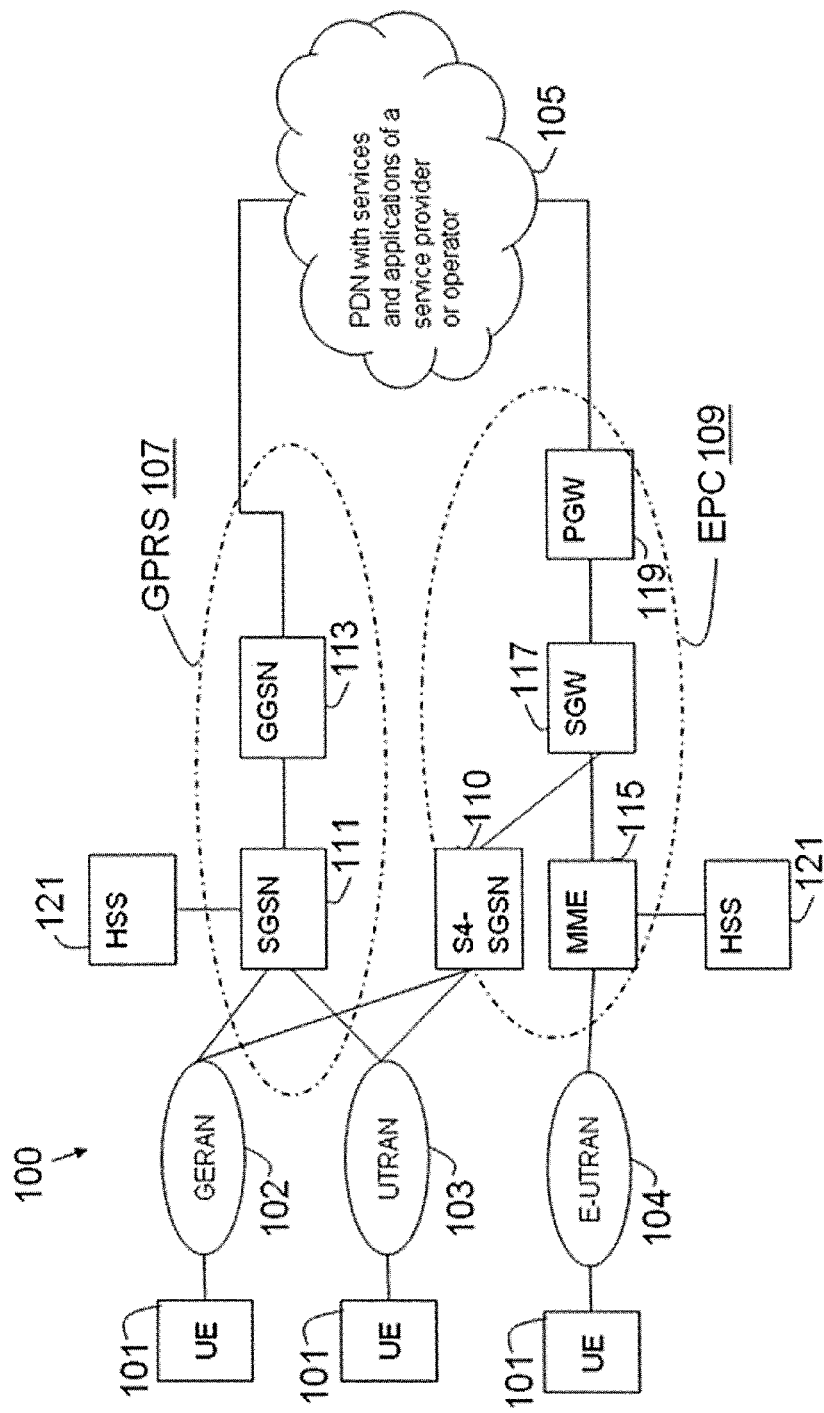
FIG. 1 is an illustrative example of a wireless network.

In order to provide a better explanation of the example embodiments presented herein, a problem will first be identified and discussed. FIG. 1 provides a general example of a communication network 100. As shown in FIG. 1, a user equipment (UE) 101 may be in communication with a RAN in the form of a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to a Service Capability Server (SCS), Application Server (AS) or hosts 105, the UTRAN/E-UTRAN/GERAN subsystem 102-104 may be in communication with a core network in the form of a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a core network function in the form of a Serving GPRS Support Node (SGSN) also known as Gn/Gp-SGSN 111, which may be responsible for the delivery of data packets to and from the mobile stations and/or UEs within an associated geographical service area. The SGSN 111 may also be responsible for packet routing, transfer, mobility management and connectivity management. The GPRS subsystem 107 may also include a core network function in the form of a Gateway GPRS Support Node (GGSN) 113, which may be responsible for the interworking between the GPRS subsystem 107 and the PDN 105.

The EPC subsystem 109 may comprise a core network function in the form of a Mobility Management Entity 115, which may be responsible for mobility management, connectivity management, idle mode UE tracking, paging procedures, attachment and activation procedures, and small data and message transfer towards the E-UTRAN 104. The EPC subsystem may also comprise a core network function in the form of a Serving Gateway (SGW) 117, which may be responsible for the routing and forwarding of data packets. The EPC subsystem may also include a core network function in the form of a Packet data network Gateway (PGW) 119, which may be responsible for providing connectivity from the user equipment 101 to one or more PDN(s) 105. Both the SGSN 111, the S4-SGSN 110 and the MME 115 may be in communication with a core network function in the form of a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

A Public Land Mobile Network (PLMN) is a network established and maintained by an operator. An operator provides mobile services to wireless devices through its PLMN. A PLMN is identified by a Mobile Country Code and a Mobile Network Code. A PLMN which a wireless device is registered to is referred to as a home wireless network. Once a wireless device travels to another PLMN, other than the home wireless network, this is referred to as a roaming state. In a roaming state, a wireless device is served by a visiting PLMN, which is referred to as a visiting wireless network.

In LTE, roaming is done either by local breakout or home routing. In local breakout, the home operator will receive information about the usage from the remote network, by using, for example, 3GPP's Policy and Charging Control Architecture. EPC handles Mobility Management and breakout in core network nodes such as the MME, SGW and/or PGW.

In current deployments, the visited network operator usually owns the infrastructure as well as the network services and conforms to a set of 3GPP standards to handle roaming and breakout, either local or home routing. Similar architecture is used both for Voice over LTE and data. Charging and subscriber usage information is exchanged between the visited network and home network via Policy and Charging Rules Function (PCRF) nodes. Such procedures are further described in 3GPP TS.23.203 and GSMA IR.88 LTE Roaming Guidelines, Version 6.0, 31 Aug. 2011.

Figure 2:
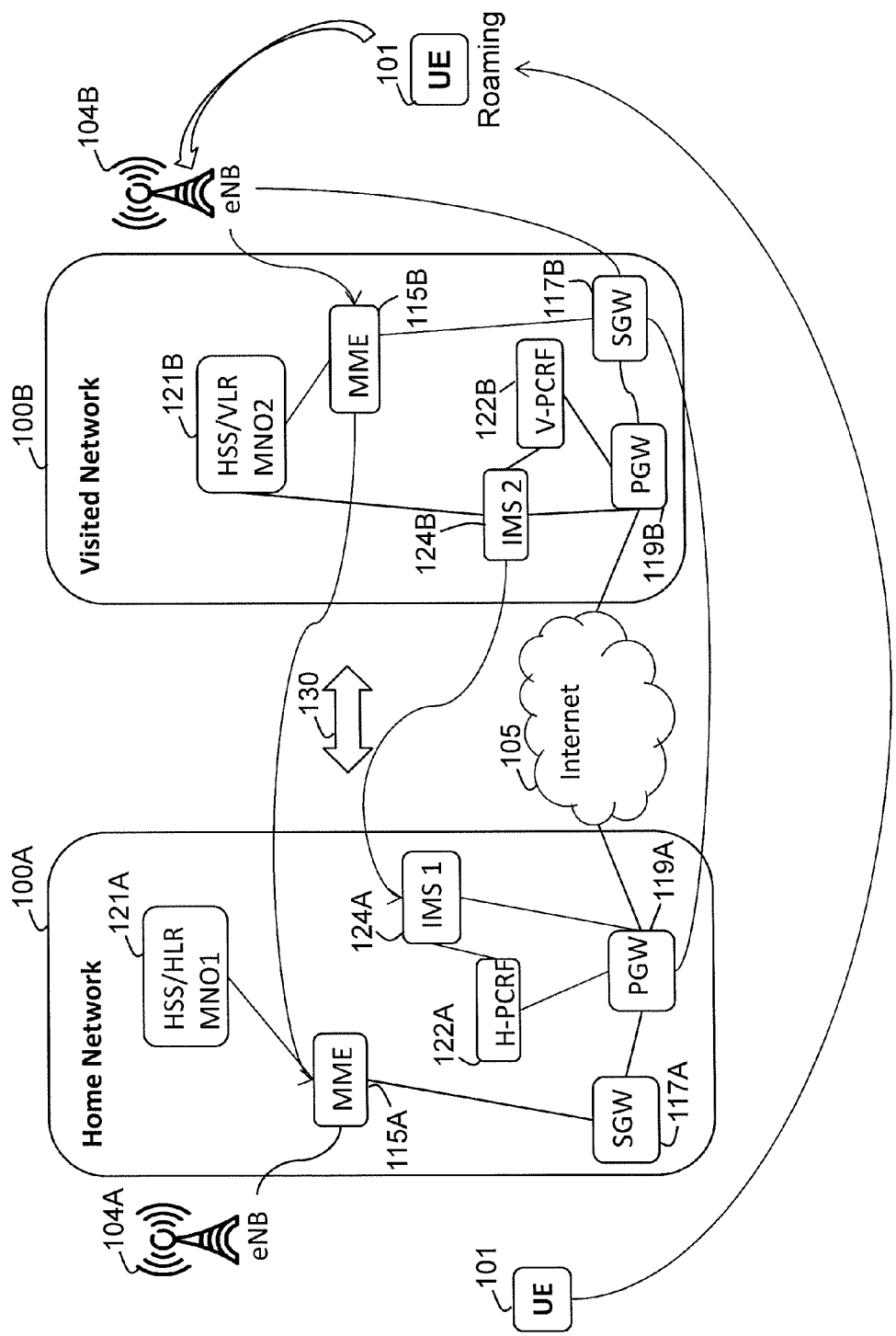
FIGS. 2 and 3 are illustrative examples of roaming in a wireless network.

FIG. 2 illustrates an example of a wireless device 101 in a roaming state between a home 100A and visiting 100B network in an LTE based system. The home wireless network 100A comprises many of the nodes discussed in relation to FIG. 1. It should be appreciated that the reference numerals of FIGS. 1 and 2 are the same for the respective nodes, where an additional indicator of an 'A' or 'B' have been included to the reference numerals of FIG. 2 to indicate if the node belongs to a home or visiting network, respectively. A node that is additional featured in FIG. 2 is a Home Policy and Charging Rules Function (H-PCRF) 122A and a Visiting PCRF (V-PCRF) 122B. The H-PCRF 122A and V-PCRF 122B provide policy control decisions and flow-based charging control functionalities for the home and visiting networks, respectively. Another node featured in FIG. 2 is an Internet Protocol Multimedia Subsystem (IMS) in each of the home and visiting networks 124A and 124B, respectively. The IMS is responsible for delivering Internet Protocol (IP) multimedia services via UTRAN and E-UTRAN.

Initially, the wireless device 101 is situated within a home network 100A and is served by a base station 104A belonging to the home wireless network 100A. At some point, the wireless device 101 may change locations such that the wireless device is unable to be serviced by the home wireless network 100A. In such situations, the wireless device 101 will send an attach message to a base station 104B of a visiting wireless network 100B.

While providing services for the roaming wireless device 101, a great deal of signaling 130 will occur between the home 100A and the visiting 100B network. For example, in establishing a connection with the wireless device 101, the MME 115B of the visiting wireless network 100B will be in communication with the MME 115A of the home wireless network 100A in order to obtain any information necessary to serve the wireless device within the visiting network. Such information may also be obtained from the home HSS 121A or the H-PCRF 122A. Furthermore, the visiting IMS 124B may also be in communication with the home IMS 124A in providing roaming services for the wireless device 101.

Figure 3:
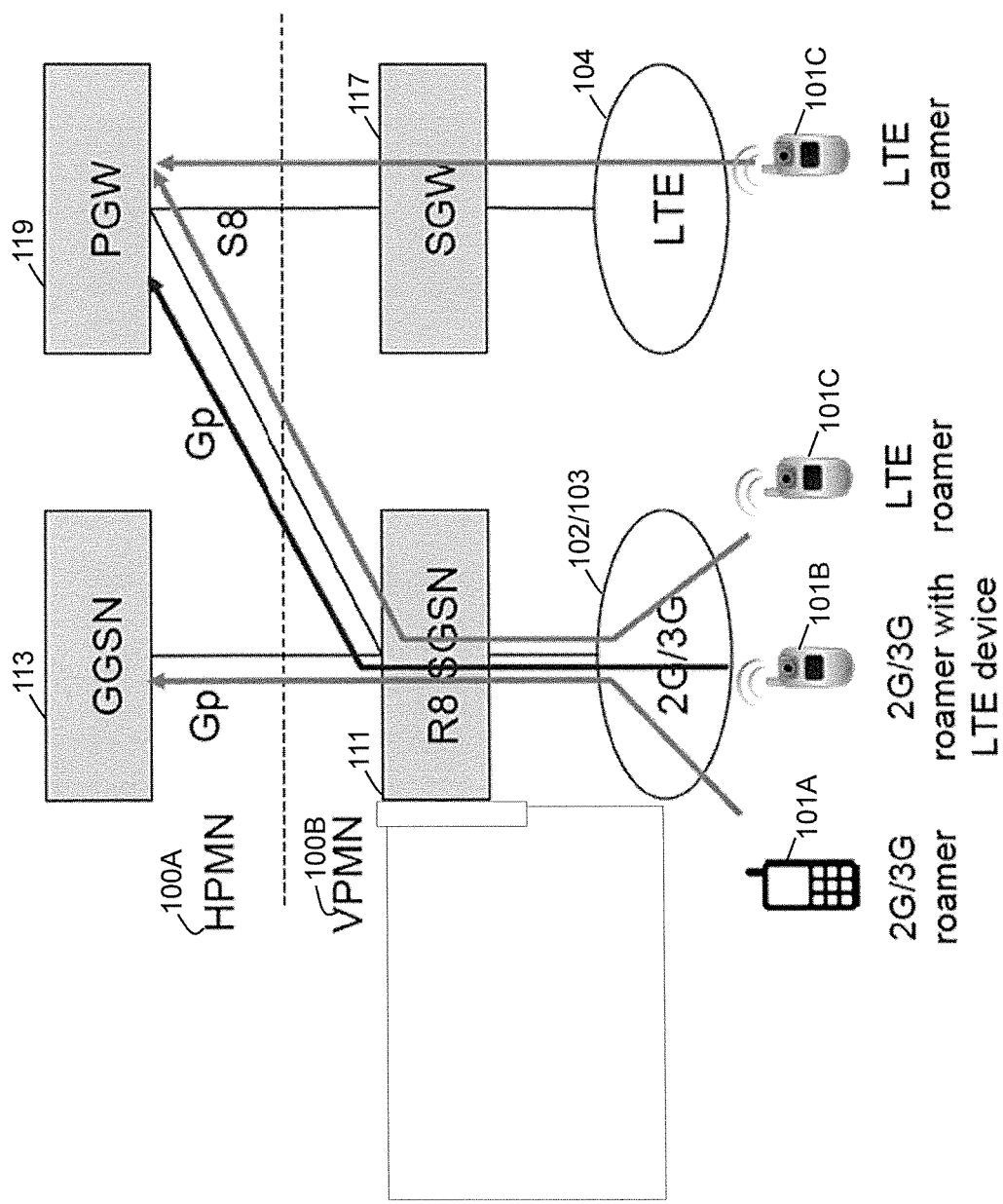

FIG. 3 illustrates an example of an inter Radio Access Type (RAT) roaming scenario. FIG. 3 features many of the elements discussed in relation to FIGS. 1 and 2. FIG. 3 also features various types of wireless devices, for example a 2G/3G roaming device 101A, a LTE wireless device roaming in a 2G/3G service area 101B and an LTE roaming wireless device 101C.

In the scenario depicted in FIG. 3, the SGSN 111 will select a gateway for the roaming device based on the wireless device's capabilities. For example, if the wireless device supports LTE, as is the case with wireless devices 101B and 101C, the SGSN 111 will select to the PGW 119 as a gateway in providing the roaming services. If the roaming device does not support LTE, as is the case with wireless device 101A, the SGSN 111 will select the GGSN 113 as a gateway for providing roaming services. It should be appreciated that other policies may be employed for gateway selection in an inter RAT roaming scenario.

Overview of the Example Embodiments

Mobile roaming is growing and generating revenue for network operators and data roaming in particular is growing at the expense of voice. However, international mobile data roaming may be expensive compared to domestic mobile data usage. Using mobile networks, for example, for global industrial solutions would impose a significant cost for roaming. An example would be a global sensor network for the supervision of windmill installation at various geographical locations. In some cases, a local sensor data aggregation function would be beneficial to deploy in the network prior to sending bulk data into a home network for further processing. By pre-processing the data, local measures could be taken based on the received data. Currently the aggregation function must be deployed 'outside' the core network, even if having it in conjunction with the core network components would be beneficial.

Drivers for data usage in roaming scenarios are mobile applications and video. In some mobile applications as well as video use case, caching of data significantly reduces the amount of traffic to and from internet as well as improves roundtrip times for accessing data. Smart caching solutions perhaps require information about the core network and/or access network in order to optimize caching mechanisms. The caching mechanisms might be dependent of the use case as well as application being used. Caching of secure data, for example, for Netflix is one such example. In these cases it would be beneficial to use specific network components, created on a need basis, in the visited network infrastructure.

At least one object of the example embodiments presented herein is to reduce signaling required during a roaming procedure. Thus, the example embodiments presented herein are directed towards providing a virtualized functionality in a visiting wireless network which is controlled by a home wireless network.

Figure 4:
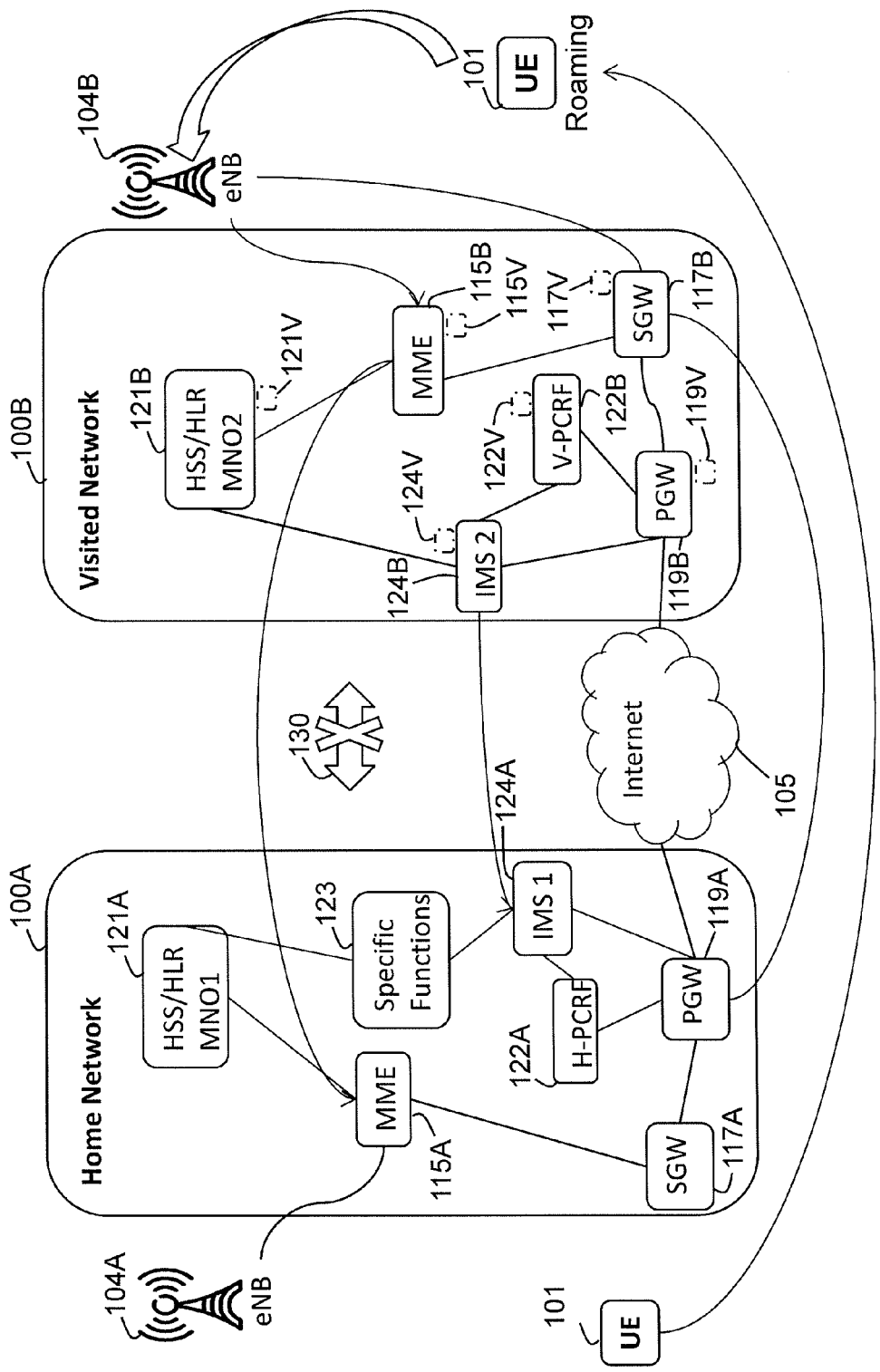
FIG. 4 is an illustrative example of roaming in a wireless network, according to some of the example embodiments presented herein.

FIG. 4 illustrates a wireless device 101 in a roaming state with a visiting network 100B which comprises virtualized functionality, according to some of the example embodiments presented herein. A node that is additionally featured in FIG. 4 is the special functions node 123. The special functions node 123 knows which software components are to be deployed in visiting wireless network in the form of a virtual representation in order to support the visiting wireless device. The special function node 123 may supply virtual representations of such functions prior or during any time a wireless device is in a roaming state.

Similarly to FIG. 3, initially the wireless device 101 is in a location such that the wireless device is served by the home wireless network 100A. At some point the wireless device 101 will enter a roaming state where it will be served by a visiting wireless network 100B.

First, the wireless device 101 will send an attach request to a base station 104B of the visiting network 100B. The attach request will comprising information to inform the base station 104B of the home wireless network 100A of which the wireless device 101 belongs to.

According to some of the example embodiments, based on the identified home wireless network 100A, the base station 104B of the visiting wireless network 100B will be able to determine if a physical node exists in which a virtual representation of a functionality of at least one core network, controlled by the home wireless network, is present in the visiting network. Such functionality is represented in FIG. 4 via dashed boxes.

In the example provided in FIG. 4, the visiting wireless network 100B comprises virtual representations of the functionality of the HSS 121V, the MME 115V, the IMS 124V, the PCRF 122V, the SGW 117V and the PGW 119V. It should be appreciated that the network of FIG. 4 is merely an example. According to the example embodiments, the virtual representations may be of any number of nodes in the network. It should be appreciated that the virtual representations need not comprise the full functionality of a node but may also comprise partial functionality of a node.

Thus, instead of relying on signaling 130 to the home network 100A in order to obtain any necessary information for serving the roaming wireless device 101, such information is provided via the virtual representation. Therefore, signaling to the home wireless network 100A is reduced.

It should be appreciated that such functionality is under the control of the home wireless network 100A. For example, upon receiving the attach request from the wireless device 101, the base station 104B will send the request to the physical node comprising the virtual representation of the functionality of at least one core network node. The physical node will thereafter authenticate the identity of the wireless device. The authentication of the wireless device 101 will be performed using the methods and under the control of the home wireless network 100A. Thus, even if the visiting network does not utilize the same means of authentication as the home network, authentication may still be performed according to the methods employed by the home wireless network. It should further be appreciated that depending on what type of virtual functionality the physical node comprises, the service provided to the wireless device 101 during the roaming state may be entirely, or significantly, controlled by the home wireless network with minimal or no signaling 130.

Upon authentication, the physical node comprising the virtual representations will continue to serve the wireless device. It should be appreciated that the various virtual representations may be provided by the home network within the visited network via the specific functions node 123. It should further be appreciated that additional functionality may be added to the visiting network at any time.

Figure 5:
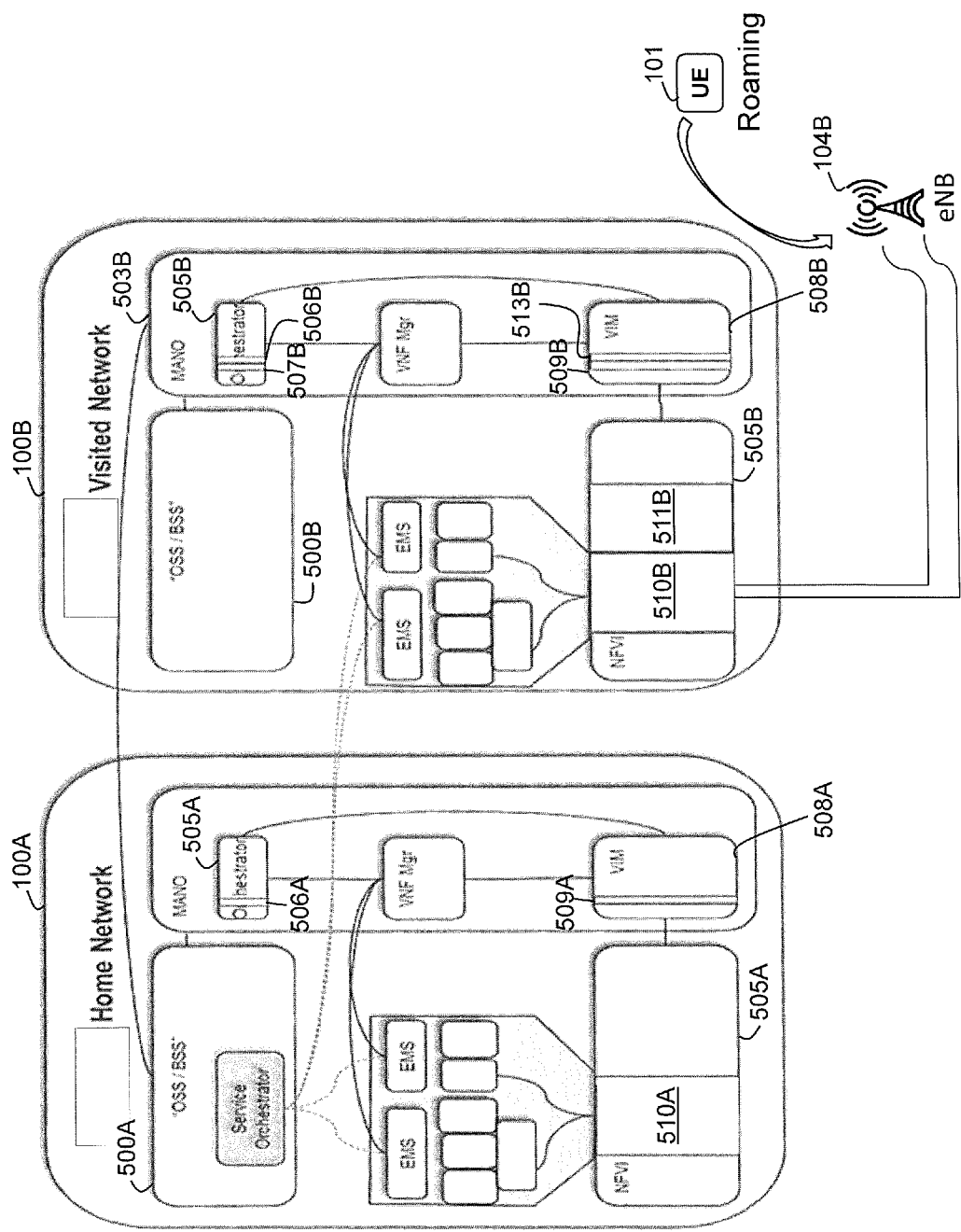
FIG. 5 is an example of a network virtualization infrastructure, according to some of the example embodiments presented herein.

It should be appreciated that the physical node may be comprised anywhere within the visiting wireless network 100B. FIG. 5 illustrates example locations of the physical node, according to some of the example embodiments. Both the home 100A and visiting 100B wireless networks comprise an Operational Support System (OSS)/Business Support System (BSS) 500A and 500B, respectively. The OSS is the functional entity from which the network operator monitors and controls the system. The OSS supports the maintenance activities of different operation and maintenance organizations. The BSS provides systems that Service Providers uses to run its business operations. According to some of the example embodiments, the physical node comprising the virtual functionality may be located within the OSS/BSS 500A or 500B.

According to some of the example embodiments, the physical node may be located in the home or visiting network within a Network Function Virtualization Infrastructure (NFVI) 505A and 505B, respectively. The NFVI comprises physical resources utilized to support virtual network functions. In the example provided in FIG. 5, the NFVI 505A of the home network 100A comprises one virtual representation 510A. The NFVI 505B of the visiting network 100B comprises two virtual representations 510B and 511B.

According to some of the example embodiments, the physical node may be located in the home or visiting network within a Management and Network Orchestration (MANO) 503A and 503B, respectively. The MANO provides orchestration and lifecycle management of the physical and/or software resources of network function virtualization. The MANO 503A and 503B comprises an orchestrator 505A and 505B, respectively, which may be used for resource management. The orchestrator 505A comprises one virtual representation 506A and the orchestrator 505B comprises two virtual representations 506B and 507B.

The MANO 503A and 503B further comprises a Virtualized Infrastructure Manager (VIM) 508A and 508B, respectively. The VIM is used to control and manage the NFVI compute, storage, and network resources. The VIM 508A of the home network 100A comprises one virtual representation 509A and the VIM 508B of the visiting network 100B comprises two virtual representations 509B and 513B.

It should be appreciated from FIG. 5 that a physical node may comprise any number of virtual representations. Furthermore, any number of physical nodes may be comprised in the network. It should further be appreciated that the virtual representations illustrated within the home network 100A may be utilized in scenarios when the home network functions as a visiting network providing coverage for a wireless device belonging to a different operator.

According to some of the example embodiments, during an attach procedure or thereafter, the physical node may determine that it does not comprise a virtual representation of a functionality required to serve the wireless device in the roaming state. In such an instance, the physical node may contact the home wireless network in order to retrieve the virtual representation of the function needed to serve the wireless device in the roaming state.

Example Node Configuration

Figure 6:
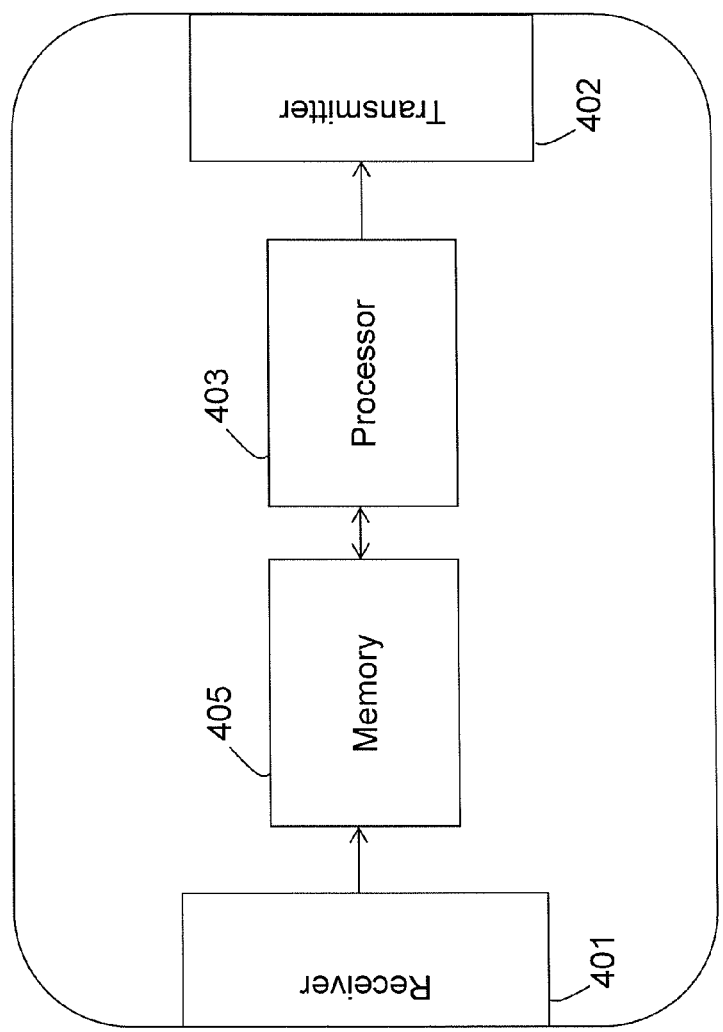
FIG. 6 is an example node configuration of a physical node, according to some of the example embodiments presented herein.

FIG. 6 illustrates an example node configuration of a physical node. It should be appreciated that the physical node may be located within the OSS, BSS, MANO and/or NVFI. The physical node may provide authentication of a wireless device within the visiting wireless network while the wireless device is in a roaming state, according to the example embodiments described herein. The physical node may further assist in providing service to the wireless device, as described herein.

The physical node may comprise a receiver 401 that may be configured to receive communication data, instructions, virtual representations of functions and/or messages. The physical node may also comprise a transmitter 402 that may be configured to transmit communication data, instructions, virtual representations of functions and/or messages. It should be appreciated that the receiver 401 and transmitter 402 may be comprised as any number of transceiving, receiving, and/or transmitting units, modules or circuitry. It should further be appreciated that the receiver 401 and transmitter 402 may be in the form of any input or output communications port known in the art. The receiver 401 and transmitter 402 may comprise RF circuitry and baseband processing circuitry (not shown).

The physical node may also comprise a processing unit or circuitry 403 which may be configured to process information in providing service and authentication for a wireless device as described herein. The processing circuitry 403 may be any suitable type of computation unit, for example, a microprocessor, digital signal processor (DSP), field programmable gate array (FPGA), or application specific integrated circuit (ASIC), or any other form of circuitry or module. The physical node may further comprise a memory unit or circuitry 405 which may be any suitable type of computer readable memory and may be of volatile and/or non-volatile type. The memory 405 may be configured to store received, transmitted, and/or measured data, device parameters, communication priorities, and/or executable program instructions.

Example Node Operations

Figure 7A:
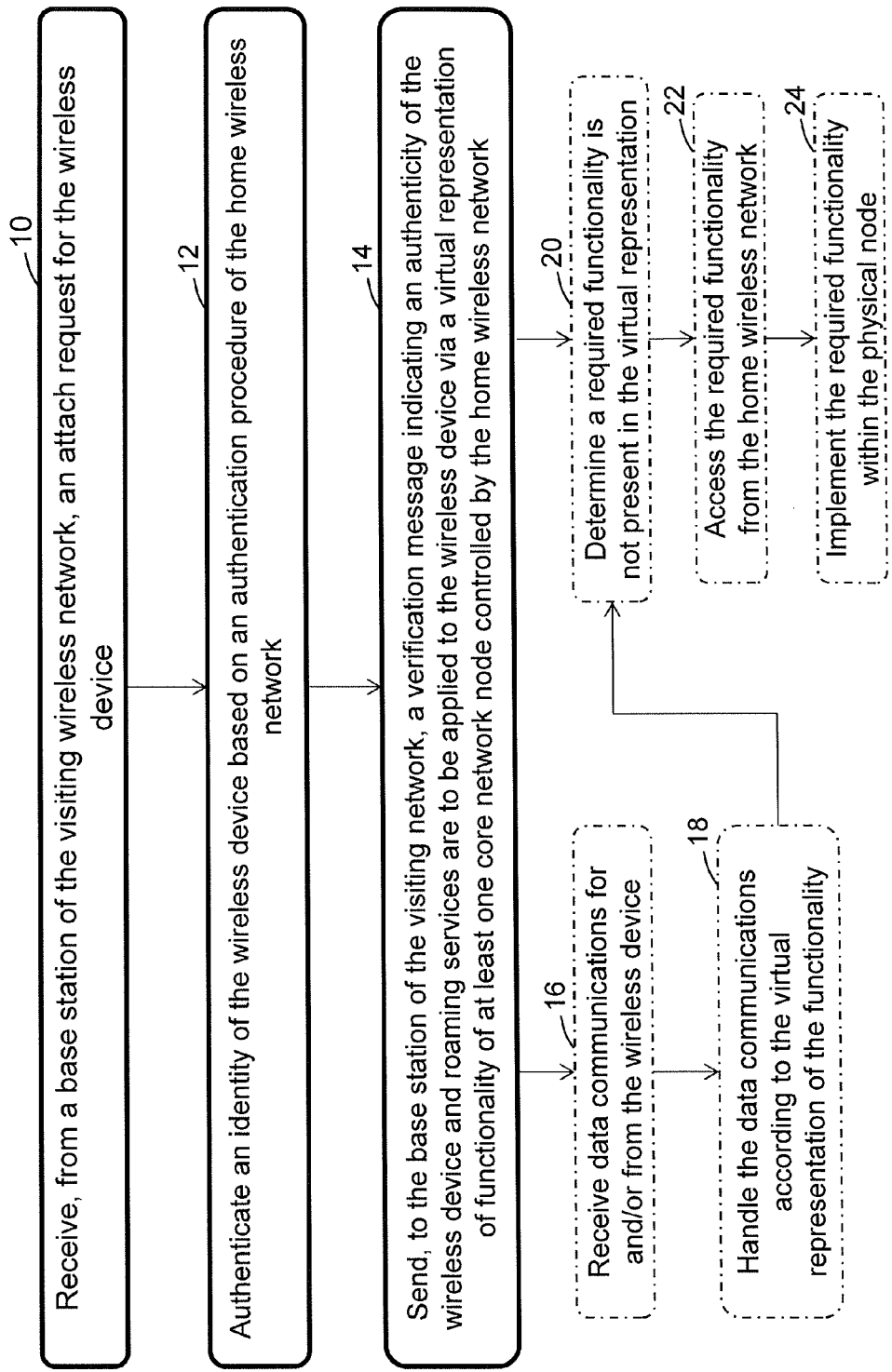
FIG. 7A is a flow diagram depicting example operations performed by the physical node of FIG. 6, according to some of the example embodiments.

FIG. 7A is a flow diagram depicting example operations which may be taken by the physical node for providing authentication and service a wireless device in a roaming state as described herein. The physical node is situated within the visiting wireless network. The wireless device is registered with a home wireless network. The physical node comprises a virtual representation of a functionality of a least one core network node controlled by the home wireless network. It should be appreciated that the home and visiting wireless networks may be of a similar or different RAT type.

It should also be appreciated that FIG. 7A comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

Figure 7B:
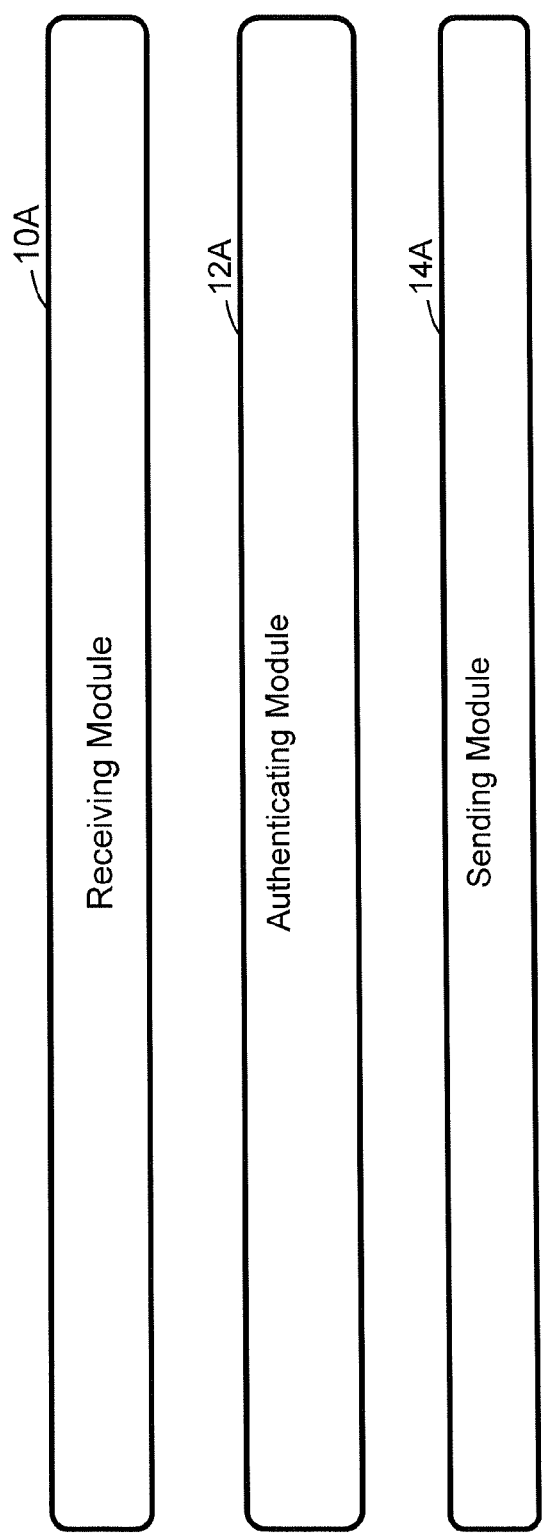
FIG. 7B is a module diagram of the physical node of FIG. 6, according to some of the example embodiments.

FIG. 7B is a module diagram depicting modules which may perform at least some of the operations of FIG. 7A.

Operation 10

The physical node is configured to receive 10, from a base station 104B of the visiting network 100B, an attach request for the wireless device 101. The receiving module 10A is configured to perform operation 10.

As described in relation to FIG. 4, the base station 104B from the visiting network will receive the attach request from the wireless device 101 in the roaming state. The base station 104B will evaluate the attach request and determine that roaming services, with the use of virtualized functionality is to be applied. Thus, the base station 104B will forward the request to the physical node.

It should be appreciated that the physical node is situated in a visiting wireless network. The physical node comprises a virtual representation of a functionality of at least one core network node controlled by the home wireless network.

According to some of the example embodiments, the at least one core network node comprises any node configured to provide authentication or identification of a wireless device. According to some of the example embodiments, the at least one core network node comprises a MME, SGSN, S4-SGSN, PGW, SGW, HSS and/or a HLR. According to some of the example embodiments, the physical node is located within a OSS, BSS, MANO and/or a NVFI.

Operation 12

The physical node is further configured to authenticate 12 an identity of the wireless device based on an authentication procedure of the home wireless network. The authentication module 12A is configured to perform operation 12.

The virtualized functionality is controlled and provided by the home wireless network. Thus, the physical node provides authentication according to methods used by the home wireless network. In such a scenario, it does not matter if the visiting and home wireless network use a different authentication method as the virtual representation of the functionality in the physical node is controlled by the home wireless network. This control by the home wireless network is provided despite the physical node being located within the visiting wireless network.

Operation 14

If the identity of the wireless device is deemed to be authenticated, the physical node is further configured to send 14, to the base station of the visiting wireless network, a verification message. The verification message indicates an authenticity of the wireless device. The verification message further indicates roaming services, via the virtual representation of the functionality, are to be applied to the wireless device. The sending module 14A is configured to perform operation 14.

Example Operation 16

According to some of the example embodiments, the physical node is further configured to receive 16 data communications for and/or from the wireless device. As described in relation to FIG. 4, the physical node may serve the wireless device with the use of the virtualized functionality. Thus, additional signaling 130 to the home wireless network is minimized.

Example Operation 18

Upon receiving 16 the data communications, the physical node is further configured to handle 18 the data communications according to the virtual representation of the functionality of the at least one core network node controlled by the home wireless network.

According to some of the example embodiments, the virtual representation of the functionality is designated for use for an identified application and/or an identified type of data traffic. For example, a specific virtual representation may designated depending on a QoS. As another example, a specific virtual representation may be designated for specific traffic such as the uplink or down link of big data.

Example Operation 20

According to some of the example embodiments, the physical node is configured to determine 20 a functionality required to carry out the received attached request, or a subsequent communication request, is not present in the virtual representation.

For example, such a determination may be made the first time the physical node provides roaming services for a particular home network or the first time the physical node services the wireless device for a specific purpose.

Example Operation 22

Upon the determining 20, the physical node is configured to access 22 the required functionality from the home wireless network. Such access may be in the form of a signaling or downloading of the virtual representation from the home wireless network.

Example Operation 24

Upon the accessing 22, the physical node is configured to implement the required functionality within the physical node. Upon such implementation, the physical node may use the accessed virtual representation in providing roaming services to the wireless device.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access. Furthermore, it should be appreciated that the term M2M device shall be interpreted as a sub-class of user equipments which engage in infrequent communications.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a physical node located in a visiting wireless network, for providing authentication of a wireless device, the method comprising:
the physical node located in the visiting network receiving, from a base station of the visiting wireless network, an attach request for the wireless device, wherein the wireless device is in a roaming state within the visiting wireless network, said wireless device being registered to a home wireless network, and wherein the physical node comprises a virtual representation of a functionality of at least one core network node controlled by the home wireless network, said at least one core network node located in the home wireless network;
the physical node located in the visiting network authenticating an identity of the wireless device based on an authentication procedure of the home wireless network, wherein the authentication is controlled by the virtual representation of the functionality of the at least one core network node controlled by the home wireless network; and
if the identity of the wireless device is deemed to be authenticated, the physical node located in the visiting network sending, to the base station of the visiting network, a verification message, said verification message indicating an authenticity of the wireless device and further indicating roaming services, via the virtual representation of the functionality, to be applied to the wireless device.

2. The method of claim 1, wherein the at least one core network node comprises any node configured to provide authentication or identification of a wireless device.

3. The method of claim 1, wherein the at least one core network node comprises a Mobility Management Entity, MME, a Serving General Packet Radio Service Support Node, SGSN, a S4-SGSN, a Packet Data Network Gateway, PGW, a Serving Gateway, SGW, a Home Subscriber Server, HSS, and/or a Home Location Register, HLR.

4. The method of claim 1, wherein the physical node is located within a Operational Support System, OSS, a Business Support System, BSS, a Management and Network Orchestration, MANO, and/or a Network Virtualization Functions Infrastructure, NVFI.

5. The method of claim 1, further comprising:
receiving data communications for and/or from the wireless device; and
handling the data communications according to the virtual representation of the functionality of the at least one core network node controlled by the home wireless network.

6. The method of claim 1, wherein the virtual representation of the functionality is designated for use for an identified application and/or an identified type of data traffic.

7. The method of claim 1, further comprising:
determining a functionality required to carry out the received attach request or a subsequent communication request, is not present in the virtual representation;
accessing the required functionality from the home wireless network; and
implementing the required functionality within the physical node.

8. A physical node, located in a visiting wireless network, for providing authentication of a wireless device, the physical node comprising a processor and a memory, said memory comprising instructions executable by said processor whereby said physical node is operative to:
receive, from a base station of the visiting wireless network, an attach request for the wireless device, wherein the wireless device is in a roaming state within the visiting wireless network, said wireless device being registered to a home wireless network, and wherein the physical node comprises a virtual representation of a functionality of at least one core network node controlled by the home wireless network, said at least one core network node located in the home wireless network;
authenticate an identity of the wireless device based on an authentication procedure of the home wireless network, wherein the authentication is controlled by the virtual representation of the functionality of the at least one core network node controlled by the home wireless network; and if the identity of the wireless device is deemed to be authenticated, send, to the base station of the visiting network, a verification message, said verification message indicating an authenticity of the wireless device and further indicating roaming services, via the virtual representation of the functionality, to be applied to the wireless device.

9. The node of claim 8, wherein the at least one core network node comprises any node configured to provide authentication or identification of a wireless device.

10. The node of claim 8, wherein the at least one core network node comprises a Mobility Management Entity, MME, a Serving General Packet Radio Service Support Node, SGSN, a S4-SGSN, a Packet Data Network Gateway, PGW, a Serving Gateway, SGW, a Home Subscriber Server, HSS, and/or a Home Location Register, HLR.

11. The node of claim 8, wherein the physical node is located within a Operational Support System, OSS, a Business Support System, BSS, a Management and Network Orchestration, MANO, and/or a Network Virtualization Functions Infrastructure, NVFI.

12. The node of claim 8, wherein the physical node is further operative to:
    receive data communications for and/or from the wireless device; and
    handle the data communications according to the virtual representation of the functionality of the at least one core network node controlled by the home wireless network.

13. The node of claim 8, wherein the virtual representation of the functionality is designated for use for an identified application and/or an identified type of data traffic.

14. The node of claim 8, wherein the node is further operative to:
    determine a functionality required to carry out the received attach request or a subsequent communication request, is not present in the virtual representation;
    access the required functionality from the home wireless network; and
    implement the required functionality within the physical node.

* * * * *